US012214384B2

(12) United States Patent
Gillest et al.

(10) Patent No.: US 12,214,384 B2
(45) Date of Patent: Feb. 4, 2025

(54) RAPID INSPECTION, SORT, TRACKING AND TRACING OF LARGE QUANTITIES OF CANS HELD FOR INSPECTION

(71) Applicants: Kevin Gillest, Frasier, CO (US); Michael Calahan, Arvada, CO (US); Nickolas Youngworth, Aurora, CO (US); Todd Hoffman, Boulder, CO (US)

(72) Inventors: Kevin Gillest, Frasier, CO (US); Michael Calahan, Arvada, CO (US); Nickolas Youngworth, Aurora, CO (US); Todd Hoffman, Boulder, CO (US)

( * ) Notice: Subject to any disclaimer, the term of this patent is extended or adjusted under 35 U.S.C. 154(b) by 45 days.

(21) Appl. No.: 18/120,398

(22) Filed: Mar. 12, 2023

(65) Prior Publication Data

US 2024/0299987 A1 Sep. 12, 2024

(51) Int. Cl.
| | | |
|---|---|---|
| *H04N 23/90* | (2023.01) | |
| *B07C 5/02* | (2006.01) | |
| *B07C 5/34* | (2006.01) | |
| *B07C 5/342* | (2006.01) | |

(52) U.S. Cl.
CPC .............. *B07C 5/3422* (2013.01); *B07C 5/02* (2013.01); *B07C 5/3404* (2013.01); *H04N 23/90* (2023.01)

(58) Field of Classification Search
CPC ....... H04L 25/067; H04N 5/63; H04N 21/485
See application file for complete search history.

(56) References Cited

U.S. PATENT DOCUMENTS

| | | | | |
|---|---|---|---|---|
| 2008/0088454 A1* | 4/2008 | Flores | ................... | G07G 1/009 |
| | | | | 340/572.4 |
| 2011/0052001 A1* | 3/2011 | Tan | ........................ | G06Q 10/08 |
| | | | | 700/214 |
| 2016/0125548 A1* | 5/2016 | Bowles | .............. | G06Q 30/0237 |
| | | | | 705/4 |
| 2016/0210648 A1* | 7/2016 | Cirannek | ................ | H04M 1/24 |
| 2022/0067865 A1* | 3/2022 | Sohmshetty | .......... | H04L 9/0825 |

\* cited by examiner

*Primary Examiner* — MD N Haque
(74) *Attorney, Agent, or Firm* — Barber Legal; Craig W. Barber

(57) ABSTRACT

A process, mechanical and electrical system and data structures, allow high speed sorting of pallets of HFI cans using a depalletizer, a sequence of narrowing transfer conveyors and a single filer making the cans into a single file. Simultaneously, data containers begin a process of compiling complete data on the pallet, the individual cans, can counts good and bad, the inspection events and potentially a marking process. Cans are inspected individually by three or more cameras in three positions, sequentially inspecting the interior, exterior sides, and exterior bottom, and if an individual can fails any one of three tests, the can is individually directed to a can reject chute. A can may be undetectably marked to indicate it has passed the inspection process. By use of comprehensive data flows and inputs, comprehensive data reports may be generated for the can maker but more importantly for the can buyer/user.

7 Claims, 4 Drawing Sheets

RAPID INSPECTION, SORT, TRACKING AND TRACING OF LARGE QUANTITIES OF CANS HELD FOR INSPECTION

FIELD OF THE INVENTION

This invention relates generally to can defects created at a can factory and specifically to the creation of a system which can sort cans which are held for inspection at high speed.

STATEMENT REGARDING FEDERALLY FUNDED RESEARCH

This invention was not made under contract with an agency of the US Government, nor by any agency of the US Government.

BACKGROUND OF THE INVENTION

In can manufacturing, there are numerous defected generated during normal operations, resulting in flawed or defective cans. During the production and inspection sequence, a pallet of rejected cans may be designated as "Hold For Inspection" (HFI).

HFI pallets of cans must be depalletized and each can inspected one by one, either visually or by means of cameras, and when batches of cans were sorted for defects, the processes used likely were unable to achieve 100% accuracy in rejecting flawed cans. In the past, such cans might even be blended into batches of good cans to reduce the odds of rejection by the final customer, a practice common enough to earn the epithet "blend and send". This is of course now totally unacceptable to the customers (the brewers, fillers, etc). All can makers are now held to higher standards of product consistency and quality.

Entire pallets of suspect cans become a problem. They either need to be inspected, held for inspection, or baled and thus wastage (crushed in smaller groups, and so become scrap for recycling or other disposition). Can makers complain that due to the slow and inaccurate nature of can inspections, entire pallets of cans begin to accumulate at production facilities, taking up space and representing a visible waste of production capacity and warehouse space.

It would obviously be preferable to provide a device, method, process and data handling structures allowing high speed inspection of cans to prevent large numbers of HFI cans from being held.

It would further be preferable to provide a device and process which could automatically route individual cans, after an individual inspection, either to be baled if the can fails inspection or sent on to the customer if the individual can passes inspection, even though the cans arrive for inspection as an entire pallet of 8,000 or more stacked cans.

It would obviously be preferable to find a way to inspect cans "held for inspection" quickly enough to eliminate the massive storage issues which pallets of such cans present and thus sharply reduce the number of cans even held in this status.

It would further be preferable to provide a system, process and data structures for tracking/tracing individual cans.

It would even further be preferable to provide a system, process and data structures for tracking individual cans by literally marking individual cans in a manner which does not itself then spoil the can.

The present invention is directed to solving these problems.

SUMMARY OF THE INVENTION

General Summary

The present invention teaches a process, with supporting mechanical system and data structures, which allows for sorting of entire pallets of HFI cans, but on an individual basis and at high speed.

The process of the invention teaches a specially modified depalletizer to separate the top layer of cans from a pallet of questionable (HFI) cans, after which a sequence of narrowing transfer conveyors briskly narrows the flow of cans until an air single filer processes the cans into a single file on a single filer conveyor. At the same time, data containers begin a process of compiling complete data on the pallet of cans, the individual cans, and the steps each can goes through in the inspection and potentially marking process. For example, if an entire pallet is found to be unacceptable, they are sent to a baler machine without passing through the individual inspection regime. On the other hand if the pallet of cans is inspected one by one and an individual can fails any one of three tests, the can may be individually directed to an individual can reject chute and thus end up at the baler machine. In yet a third contingency, a can may be marked to indicate the fact that it has passed through the inspection process and found acceptable, with the marking made in such a manner as to undetectable to the naked eye and thus the marking does not itself spoil the can.

By use of comprehensive data flows and inputs, comprehensive data reports may be generated for the can maker but more importantly for the can user (the beverage maker).

In the present invention the cans are first examined from the top by a camera which individually inspects the cans' interiors. Any cans failing this inspection go to a first chute for removal from the overall pallet of inspected cans. In a second examination, the cans are inspected on the exterior side surface (the outside of the generally cylindrical can body) for decoration defects. Cans failing the second test are sent to a second chute, again for removal from the overall pallet of HFI cans.

Prior to the third examination, the cans must be handled in a very specific manner. The individual cans, which had been held on a vacuum conveyor by the bottom end, must be transferred to a different vacuum conveyor to be held by the top end. With the bottom end thus suspended in the air, a third camera may inspect the bottom of the can ("dome") on the exterior of the bottom. (Note that the interior surface of the dome will have been inspected by the first camera). Cans which fail the inspection while suspended from the top end then get sent to a third chute for disposition.

While cans are suspended, the bottom end is accessible for marking. Since marking on the bottom end which is visible to the naked eye is generally unacceptable, the marking may be made in UV reactive ink visible only under UV light. This allows the beverage maker (the can buyer) to know that certain cans have been held for inspection but passed through a more rigorous individual inspection and been approved, and even exactly which cans this has happened to.

Cans may then be repalletized by a palletizer and placed on a pallet layer by layer until the pallet is full or all cans have been inspected.

Data structures associated with the process are necessarily complex and very specific to the context of can manufacturing. For example, certain data structures such as employee information are customary in any business. However, the pallets of HFI cans entering the process need a data set associated therewith, for example a sticker bearing a scannable code, which conveys file ID, pallet ID, can type ID, and date and time of palletizing, arrival, etc. The cameras used in the inspections must create additional data structures such as file ID, camera ID, camera action code ID, disposition action code ID, image location, trigger time and date, start and end times, and the data structure required for each will uniquely require multiple files of this type since each can will be inspected by multiple cameras. Events during the process will generate data structures unique to the can manufacture and inspection process and so forth.

All this data must be comprehensively collected and made available to both the operators at the can making facility and the can buyer. Thus, older systems for inspecting cans (regardless of using cameras for the inspection) did not allow rapid inspection (an entire layer of cans from a pallet entering the device at the same time) and did not allow extremely fine grained tracking of the exact results of the inspection, including information about the exact defects that made some cans unacceptable, defect rates as well as types, time each defect is found, etc, as well as allowing virtually instantaneous disposition of the cans rejected: usually sent in batches to a baler for quick crushing.

The numerous data sources, data inputs, and data handling hardware of the present invention will be discussed in further detail in the detailed disclosure of the invention.

Summary in Reference to Claims

It is therefore another aspect, advantage, objective and embodiment of the invention, in addition to those discussed previously, to provide a system for quickly inspecting and sorting large quantities of cans held for inspection, and tracking and tracing can disposition down to the level of the individual can, such cans having an interior, a side exterior, and a dome exterior, and having decoration, some of such cans being unacceptable, the cans stacked in layers on a pallet, the pallet having thereon a scannable pallet code, the system at least comprising:
  a set of components comprising:
  a plurality of non-camera components including at least one sensor;
  a badge scanner and an employee data structure;
  a human machine interface allowing control of the system after the badge scanner has accessed the employee data structure;
  a hand scanner operative to scan such scannable pallet code and derive therefrom a pallet data container having therein a pallet ID, a hand scanner ID, and the time of insertion of such pallet into a depalletizer;
  the depalletizer operative to push one of such layers of such cans from such pallet;
  a plurality of transfer conveyors operative to receive such layer of such cans and sequentially transfer and reduce such layer of such cans;
  a single filer operative to receive such transferred and reduced layer of such cans and place such cans into single file on a single file bottom vacuum conveyor;
  a plurality of cameras, each camera operative to inspect one part of each of such cans, each respective camera having a respective disposition chute, each camera operative to direct such unacceptable cans to the camera's respective disposition chute;
  an action code data structure template able to contain information regarding each action taken by the system;
  a component data structure associated with each non-camera component of the system;
  a component action data structure associated with an action performed by each non-camera component of the system and having therein data taken from the action performed by the non-camera component of the system and an instantiation of the action code data structure;
  a respective camera data structure associated with each of the cameras;
  a camera action data structure associated with an action performed by each camera;
  an event data container associated with each component action data structure and each camera action data structure and having therein data taken from the action performed by the camera and an instantiation of the camera action code data structure;
  a programmable logic controller containing in non-transitory storage media instructions enabling it to control the system, including non-camera components and cameras, and further enabling it to transfer data from the human machine interface to a comprehensive database;
  the plurality of cameras, the plurality of non-camera components, the programmable logic controller, the badge scanner and the hand scanner operative to send all of the data structures and the event data container to the comprehensive database;
  a CPU containing in non-transitory storage media instructions enabling it to produce reports and data files in a first format, and further enabling it to print such reports and data files on a printer, and further enabling it to accept access from a client computer.

It is therefore another aspect, advantage, objective and embodiment of the invention, in addition to those discussed previously, to provide a system, the action code data structure further comprising:
  an action code ID field, an action name field, an indication of such can being found unacceptable field;
  the camera action data structure further comprising:
  a camera action code ID field; an image location field, and a trigger date and time field;
  the non-camera data structure further comprising:
  a non-camera component action code ID field, and a trigger date and time field.

It is therefore another aspect, advantage, objective and embodiment of the invention, in addition to those discussed previously, to provide a system, wherein:
  at least one first-position camera of such plurality of cameras is disposed above the single file bottom vacuum conveyor and oriented to view downward into such interior of each of such cans as such cans are conveyed underneath the at least one first-position camera.

It is therefore another aspect, advantage, objective and embodiment of the invention, in addition to those discussed previously, to provide a system, wherein:
  at least one second-position camera of such plurality of cameras is disposed adjacent the single file bottom vacuum conveyor and oriented to view sideways to such side exterior and such decoration of each of such cans as such cans are conveyed adjacent the at least one second-position camera.

It is therefore yet another aspect, advantage, objective and embodiment of the invention, in addition to those discussed previously, to provide a system, further comprising:

a vacuum transfer station having a single file top vacuum conveyor operative to convey such can, the single file bottom conveyor then departing from such can whereby such can is suspended with such can dome exterior visible;

at least one third-position camera of such plurality of cameras is disposed beneath the single file top vacuum conveyor and oriented to view upward to such can dome exterior as such can is conveyed over the at least one third-position camera;

an ink dot printer operative to print an inspection mark onto such can dome exterior using an ink invisible to the naked eye.

Therefore further aspects, advantages, objectives and embodiments of the invention, in addition to those discussed previously, are to provide a system further comprising:

a bulk rejection gate allowing such layer of such cans to be removed from the system without being placed in single file and without being inspected.

It is therefore another aspect, advantage, objective and embodiment of the invention, in addition to those discussed previously, to provide a process for rapidly inspecting and sorting large quantities of cans held for inspection, and tracking and tracing can disposition down to the level of the individual can, such cans having an interior, a side exterior, and a dome exterior, and decoration, some of such cans being unacceptable, the cans stacked in layers on a pallet, the pallet having thereon a scannable pallet code, the process comprising: scanning such scannable pallet code;

depalletizing such cans one of such layers at a time;

sequentially reducing such layers of such cans and place such cans into single file;

conveying such cans while securing them so that such interior and such side exterior are visible;

passing such cans beneath at least one first position camera operative to transfer to a first disposition chute any such can having an unacceptable interior;

passing such cans adjacent to at least one second position camera operative to transfer to a second disposition chute any such can having an unacceptable side exterior and unacceptable decoration;

conveying such cans while securing them so that such dome exterior is visible;

passing such cans above at least one third position camera operative to transfer to a third disposition chute any such can having an unacceptable dome exterior;

printing an inspection mark onto such can dome exterior using an ink invisible to the naked eye;

providing an action code data structure template able to contain information regarding each action taken;

providing a component data structure associated with each non-camera component used to carry out the process;

providing a component action data structure associated with an action performed by each non-camera component used to carry out the process and having therein data taken from the action performed by the non-camera component and an instantiation of the action code data structure;

providing a respective camera data structure associated with each of the cameras used to carry out the process;

providing a camera action data structure associated with an action performed by each camera used to carry out the process;

providing an event data container associated with each component action data structure and each camera action data structure and having therein data taken from the action performed by the camera and an instantiation of the camera action code data structure; storing in a comprehensive database the event data container.

INDEX TO REFERENCE NUMERALS

Figure 1:
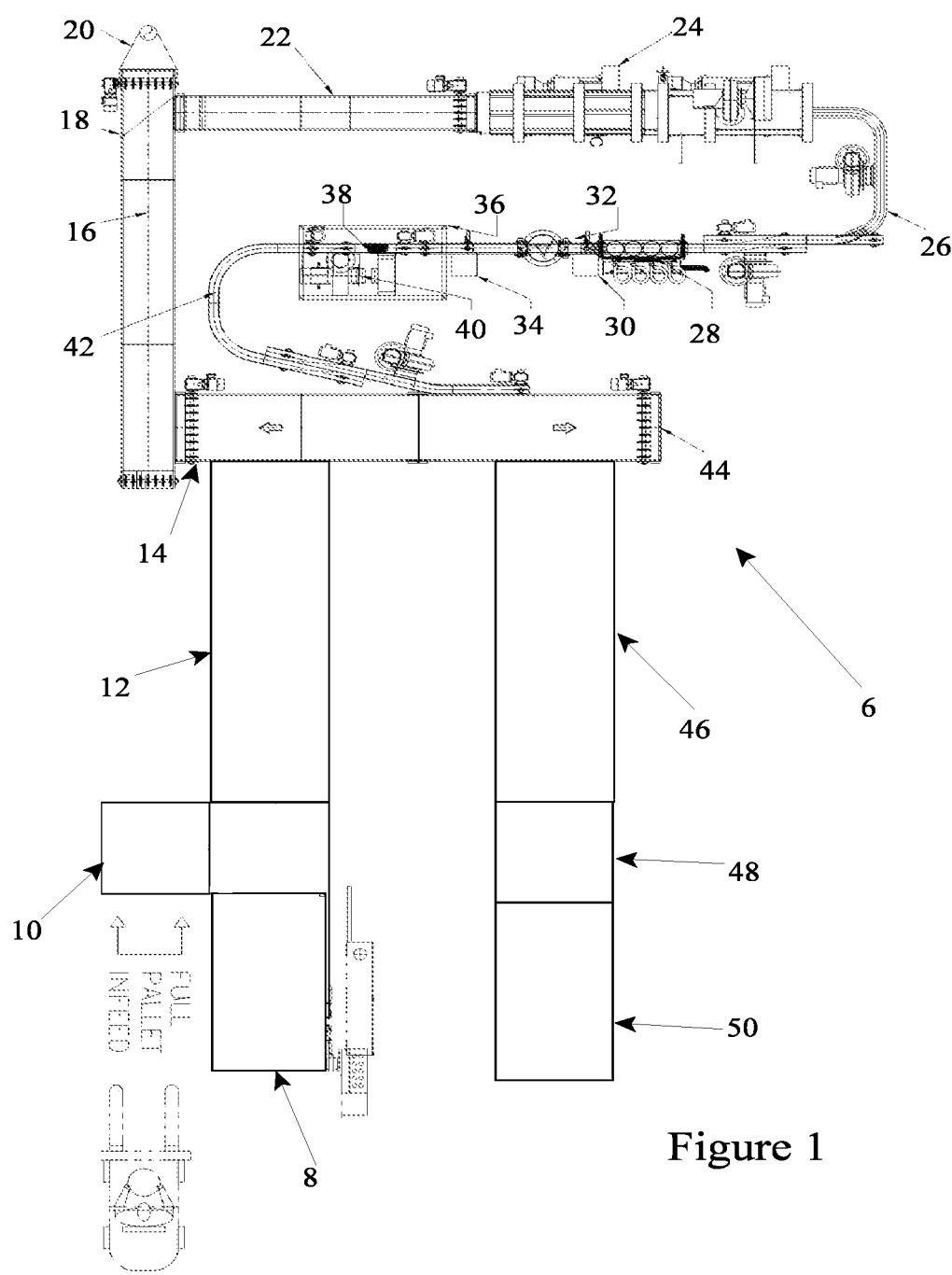
FIG. 1 is a planform diagram showing the major physical components of the rapid sort system of the inventions preferred embodiment and best mode presently contemplated.

FIG. 1:
Rapid sorting mechanical structures 6
Depalletizer 8
Full pallet infeed 10
Palletwidth infeed conveyor 12
First intermediate width transfer conveyor 14
Second intermediate width transfer conveyor 16
Baler discharge gate 18
Baler discharge chute 20
Third intermediate width transfer conveyor 22
Air single filer 24
Single file air conveyor 26
Inside camera #1 28
Inside defect rejection chute #1 30
Deco camera #2 32
Deco defect rejection chute #2 34
Vacuum transfer station
    (from bottom conveyance to top conveyance) 36
(bottom of can) Bodymaker ID &
Ink dot camera #3 with ink dot assurance printer 38
Ink dot defect rejection chute #3 40
Single file vacuum conveyor 42
Fourth intermediate width transfer conveyor 44
Palletwidth outfeed conveyor 46
Pallet size layer outfeed 48
Palletizer (repalletizer) 50
FIG. 2
Badge scanner 100
2D hand scanner 102
Rapid sort machine inputs 104
Human machine interface 106
PLC 108
Reports (printable) 110
Camera system & camera database 112
Processing & formatting 114
Master database/data compilation database 116
Output 118
Database access 120
Client access 122
Client data sources 124
Output file 126
Data request 128

Figure 3:
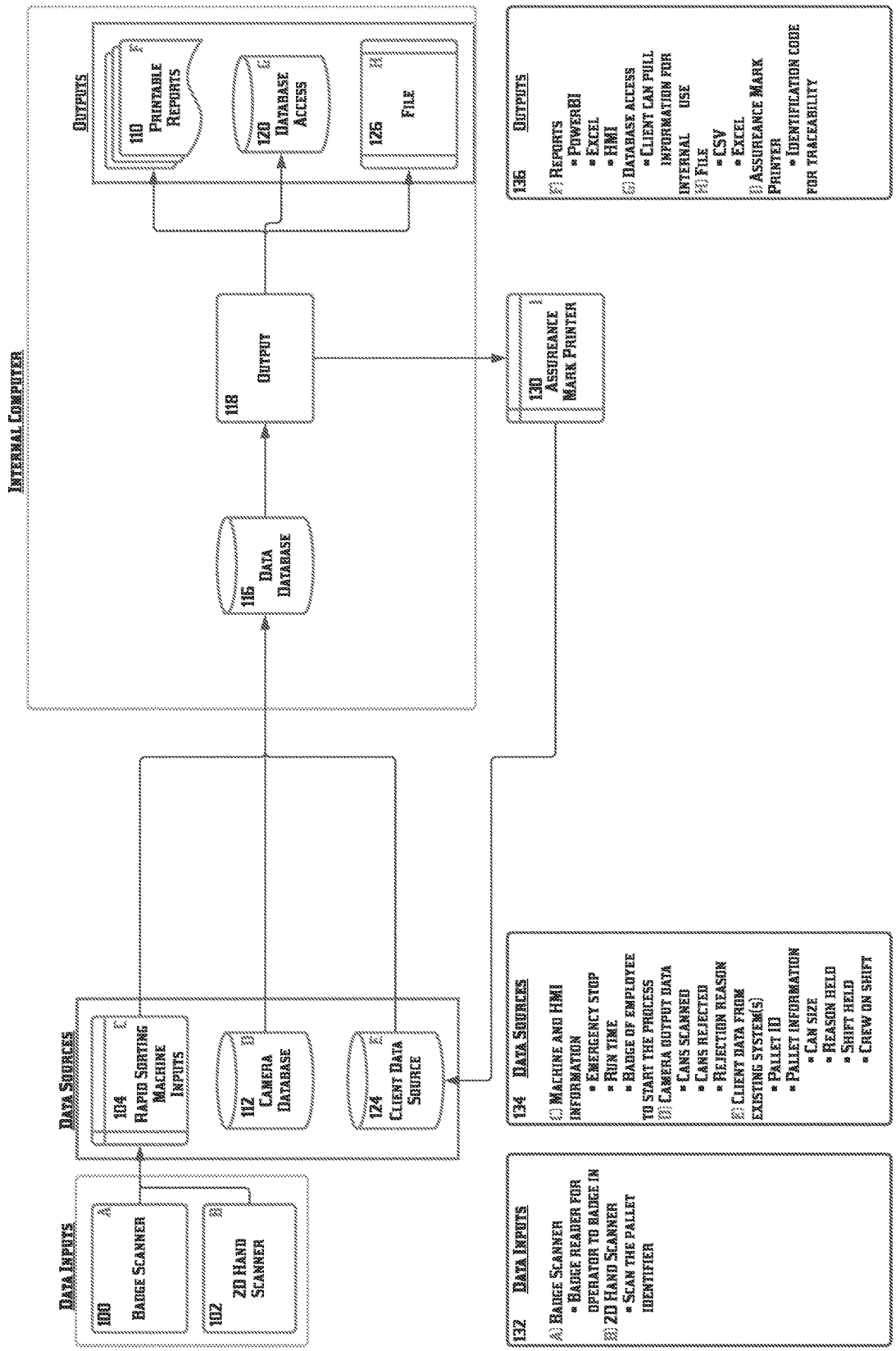
FIG. 3 is a second embodiment of the data acquisition and reporting of the data structures of the present invention in a simplified embodiment, also showing hardware components.

Assurance mark printer 130
Data input class 132
Data sources class 134
Output class 136
FIG. 3
RFID reader employee data 200
Component action 202
Component 204
Pallet 206
Event 208
Action code 210
Event client bridge 212
Camera action 214
Camera 216
Client data (external sources) 218

DETAILED DESCRIPTION

Glossary

As used herein, "such" refers to items which are not part of the invention itself but rather are work pieces sorted by the invention, including cans, can interiors, exteriors, domes, decorations, layers of cans, pallets of cans, etc.

As used herein a "can buyer" is NOT an end consumer, for example a human being buying a can of soft drink. Instead, a "can buyer" is a bottler/beverage manufacturer/filler, whose businesses require large quantities of empty, decorated, and reliably inspected cans continually flowing into the bottling/beverage manufacturing facility.

As used herein, a non-camera component of the system is at least one of the following: a sensor, a conveyor, an air jet, a switch and other devices measuring the status of different mechanical and electronic components of the system, and so forth.

As used herein, the term "disposition" refers to either accepting a can and palletizing it after inspection or removing a can from the inspection process after the can has failed. Disposition may refer to going to a baler, which compacts numerous cans for recycling. Disposition may also refer to re-basecoating the cans which fail inspection and reusing them without recycling.

As used herein, reports refers to printed and electronic reports, and also to providing online reports, alerts and so forth, as well as files, which may refer to providing a file in any common format such as .csv or the like.

HMI, human machine interface, refers to a control panel, for example, a touch screen, keyboard, app or the like.

HFI on the other hand refers to cans "Held For Inspection", that is, believed to have some quantity of defects among the cans.

End Glossary

FIG. 1 is a planform diagram showing the major physical components of the rapid sort system of the invention. It is important to understand that the system of the invention relies upon mechanical, electrical, and digital devices, and the unique arrangement of both the machinery and the data which is collected. The present system is NOT automation by computer of a pre-existing machine or business practice but rather allows unique and new business practices by providing unique and new data structures both to can makers and to their customers, which are in turn enabled by a unique arrangement and ordering of equipment used in the industry.

Rapid sorting mechanical structures 6 (meaning, the mechanical components of the overall system) start with depalletizer 8 which is similar but not identical to known depalletizers. This device takes a full pallet onto full pallet infeed 10 and then pushes off the top layer of the cans that were on the pallet (and then on the system/conveyor) that is, a full layer of the cans.

Palletwidth infeed conveyor 12 is able to accept the full layer of cans, however, for individual inspections the cans will necessarily be narrowed ("reduced") down to a single file. This is partially accomplished using a series or sequence of intermediate width transfer conveyors. First intermediate width transfer conveyor 14 may for example be 36" wide, and second intermediate width transfer conveyor 16 may be 24" wide, but these are just exemplary.

Baler discharge gate 18 would allow the system to dispose of large numbers of cans without inspection if the decision is made that the entire pallet of cans should be rejected, specifically if the cans should be crushed into a dense mass for recycling. The baler machine however cannot accept an entire pallet of cans at once so wholesale rejected cans must be regulated as they are diverted: the gate allows the cans to pass through in groups when open, but when shut prevents overloading the baler. Baler discharge chute 20 actually conveys the cans to the baler (not shown).

Third intermediate width transfer conveyor 22, which is narrower again, is for the cans which are not rejected en masse (as a group), and leads to the air single filer 24. This device places the cans in single file and puts them onto single file air/vacuum conveyor 26. At this stage, the conveyor 26 is using vacuum applied to the bottom of the cans to hold them and convey them.

The first camera the cans pass is the inside camera #1 (see reference numeral 28), which is disposed above the conveyor 26 and the file of cans. In this (first) position the cameras can see downward through the open top of the cans to inspect the interior. This camera inspection may be manual (eyeball watching monitor) but obviously for the required speed of the system automatic inspection is essential required.

Inside defect rejection chute #1 30 is activated by the inside camera 28. When a can is rejected, it goes down the chute 30 for disposition, which as noted may be recycling, or re-basecoating and reuse, etc.

Deco camera #2 (see reference numeral 32) is disposed in a second position beside the file of cans, which rotate as they pass so that the camera (or multiple cameras) may see all of the exterior (cylindrical) sides of the cylindrical body and the decorations thereon. Deco defect rejection chute #2 34 receives those cans which camera 32 rejects. Note that by having multiple chutes and not trying to continue inspecting cans which have already been rejected in a previous phase, processing is greatly speeded up, a necessity given the huge numbers of HFI cans which accumulate in production facilities.

Vacuum transfer 36 transfers the cans from being vacuum conveyed while held on the bottom to being vacuum conveyed while held on top. That is, vacuum is now applied to the top of the can, while the bottom conveyor is separated from the bottom of the cans. The cans, now suspended from their tops, continue on, and they pass over ink dot camera #3 38 which inspects the bottom of the cans from a position below the suspended cans. Carbonated beverage cans have a domed bottom, which in turn may bear inconspicuous ink marks used to verify that the ink is correct (and thus the decoration of the can is correct), or is used for batch numbers, dates and so forth. If the bottom does not pass inspection, the can is fed to the ink dot defect rejection chute #3 40.

Single file vacuum conveyor 42 may at this time be suspending the cans from the top or supporting them from the bottom as it returns them to a fourth intermediate width transfer conveyor 44 for return to a pallet width outfeed conveyor 46, which orders the cans on the pallet size layer outfeed 48 where a palletizer (repalletizer) 50 accepts each layer of inspected and approved cans.

However, it turns out that the mere mechanics of the system do not convey the actual picture of the processing which occurs. In particular, there has been no discussion yet of the tracking and tracing of the invention which requires novel data structures.

A beverage filler receiving a pallet of cans would have no assurance that the pallet of cans had actually been inspected and re-sorted based on their acceptability.

One physical way to provide some assurance is to provide an assurance mark printer 130 (FIG. 2) which, while the can is suspended from the top, places an assurance mark which is invisible to the naked eye on the bottom of the can. The assurance mark printer 38 is thus located with the ink dot camera in position three. The mark may be UV ink for example. If a beverage filler experiences problems, this will allow them to know whether the problems are due to the HFI-inspected-sorted cans or other cans.

But even that does not allow tracing of individual cans, understanding of the types of manufacturing defects occurring, data sharing with customers and production operators and so forth.

Thus, a series of data structures are required in order to provide a complete picture of the status of the cans, and these data structures and their handling are also parts of this invention.

Figure 2:
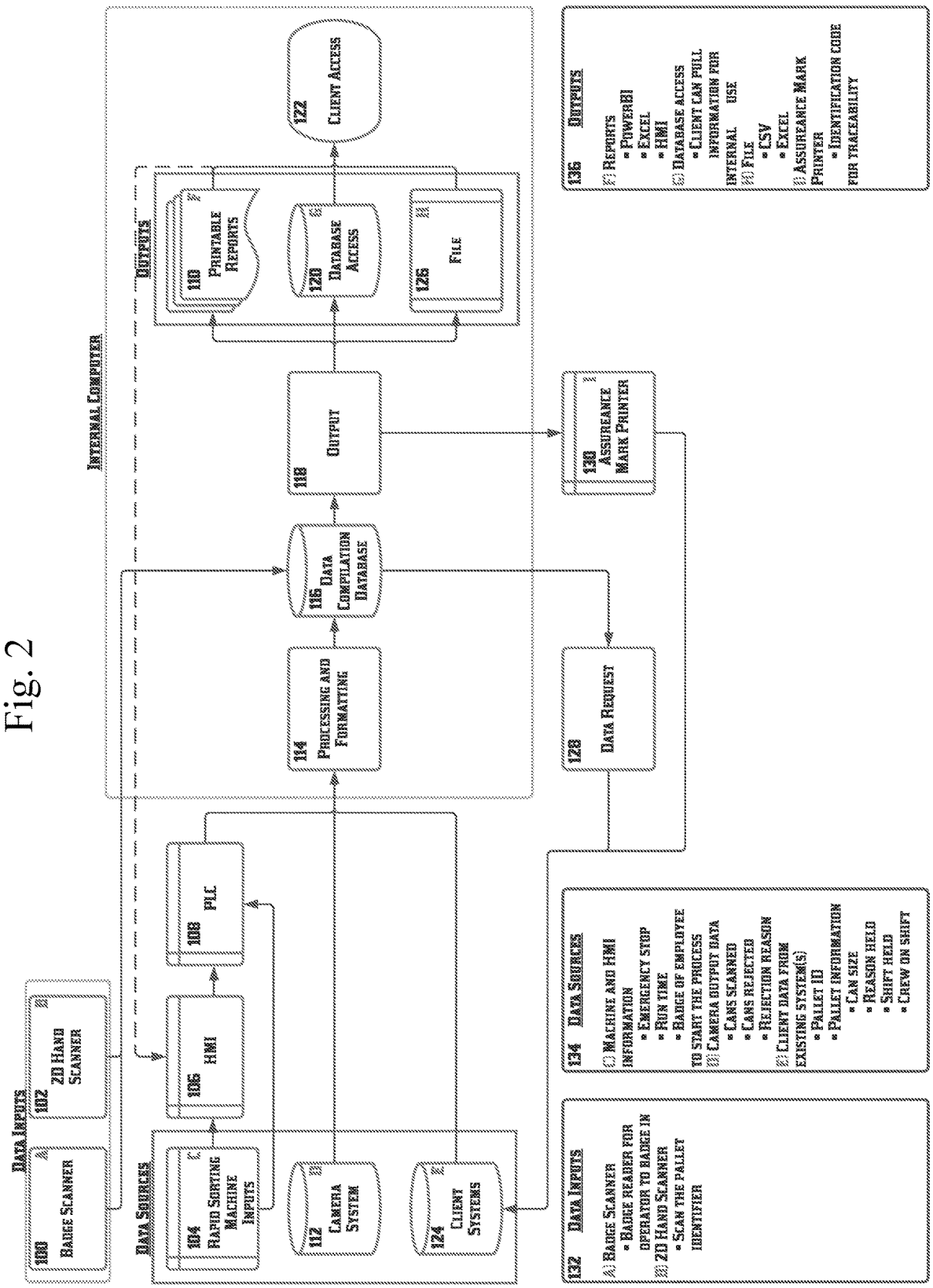
FIG. 2 is a data acquisition and reporting diagram of the data structures of the present invention, also showing hardware components required for the preferred embodiment and best mode presently contemplated.

FIG. 2 is a second embodiment of the data acquisition and reporting of the data structures of the present invention required by the device, also showing hardware components required by the data structures of the invention.

Badge scanner 100 collects data from an employee badge and matches it to an employee data file: if the employee is permitted, the machine may begin operation under the guidance of the employee.

Before the machine can operate though, the size and type of the cans must be known so that the machinery can be adjusted to handle that size of can. The desired and approved decoration the cans should have should be known and so forth. In order to provide this easily, the 2D hand scanner 102 reads a scannable code on the incoming pallet of cans. The code contains the information needed by the operation/system, but also may contain other information as needed for customer satisfaction.

Rapid sort machine 2 as well as client-side data 124 and the camera database 112 will all provide data to the system of the invention via processing and formatting (114) and inclusion in comprehensive database 116. Client-side systems 124 may also make data requests 128 from the data compilation database 116.

In addition, the device itself and its operators provide information via the human machine interface HMI 106 and the programmable logic controller 108 actually operating the device/system on the machinery side (not to be confused with the hardware side or the data structures side).

This in turn is used by a computer (not the programmable logic controller operating the machinery) to create output for information for both the can maker and the can filler/buyer (see client access 122). For example, the can filler/buyer may need to know which pallets of cans came through this inspection process and which did not, while the can maker may need to know if their production machinery (not shown and not part of this invention) is producing an unusually large ratio of cans with a particular defect, for example, if the exterior sides are being mis-decorated. This of course allows the maker to check for problems in their production line.

Reports (printable) 110 (on an inkjet printer or the like, output 118), database access 120/client access 122, output files 126 in various formats (Excel, .csv, etc) and so forth may all be provided. Note that client access refers to a server/client computer relationship, but may refer to the actual beverage filler/buyer of the cans if they have a client computer and are permitted limited access to the comprehensive database 116.

Client-side computers of the can maker, can buyer or others may also provide inputs to the data structures, as seen in box 124.

Note that items 132, 134 and 136 (Date Inputs, Date Sources, and Outputs) provide provide convenient tabular expansion of the drawing information in the corresponding boxes above them. Index letters are provided (Letters A through I) linking different data structures together between the tabular boxes below and the linked boxes above in the drawing. Badge scanner 100 and 2D hand scanner 102 are presented in FIG. 2 in a box labelled "data inputs". At the bottom of the drawing, item 132 shows a more detailed listing of the data inputs required in order for the device of the invention to function. The rapid sorting machine inputs 104, camera system 112 and the client systems 124 are presented within the box labeled "data sources", while at the bottom of the figure, item 134 ("Data Sources") provides some expanded examples of the data sources: run time, emergency stops, cans scanned, cans rejected and the reasons, etc. Item 136 similarly corresponds to the box above it ("Outputs") containing items 110, 120 and 126 (Printable reports, database access and files).

At this point it is worth reiterating that the present system is NOT mere automation of a hypothetical manual process. There is no known comprehensive HFI (held for inspection) can sorting machine presently on the market, as seen in FIG. 1 and represented by the various electro-mechanical devices seen toward the left-had side of FIGS. 2 and 3. The machinery side is unique and the computer hardware side (labelled "internal computer") and the data structure side (depicted in the three boxes data inputs, data sources and outputs in both machinery, and hardware and then expanded at the bottom of the figure) are all necessary to make the novel machinery part of the system to work; contrawise, the data structures of the invention stand as novel inventions themselves, but require this or equivalent new mechanical/electrical systems and hardware system in order to operate. There is no non-automated analog of this machine in the prior art and thus the machine is not mere automation of a process previously known: this process was not previously known, the machinery was not previously known.

FIG. 3 is a data acquisition and reporting diagram of the data structures of the present invention, also showing hardware components required for the data structures.

In this embodiment, the data inputs box containing badge scanner 100 and 2d hand scanner 102 is seen and expanded upon in box 132 for data inputs, the data sources box (holding once again 104, 112 and 124) and the data sources 134 table below it are seen, and the outputs box 136 is seen below the outputs in a box above in the drawing, showing 110, 120 and 126. (Referring to rapid sorting machine 104, camera system 112, client data source 124, printable reports 110, database access 120 and file 126).

While these components are identical or similar to the same numbered components in the previous embodiment of FIG. 2, it may be seen that the data flow has been altered.

Firstly, the data inputs (100 and 102) now flow to the rapid sort machine 104 (item 2 in FIG. 1) itself, before being passed on to the hardware (non-transitory storage media, a disk storage device, solid state disk, etc) of data compilation database 116. In this embodiment, the HMI and PLC may be considered to be part of the machine 2 but are ignored for data flow purposes. Data formatting and processing is also ignored for this embodiment, being incorporated elsewhere.

While the output (printer, db access, etc) 118 is still available to provide the printable reports 110, database access 120 and files 126, it may be seen that client access is no longer required.

Note also that client data requests from the comprehensive data database 116 are no longer used.

In this simplified chart of the machinery, data, and hardware, it may be seen that the device and system of the invention may be optimized, simplified, and altered. It may also be seen that a few elements of the invention may even be eliminated or deprecated as lower level sub-component parts of other systems of the device.

Figure 4:
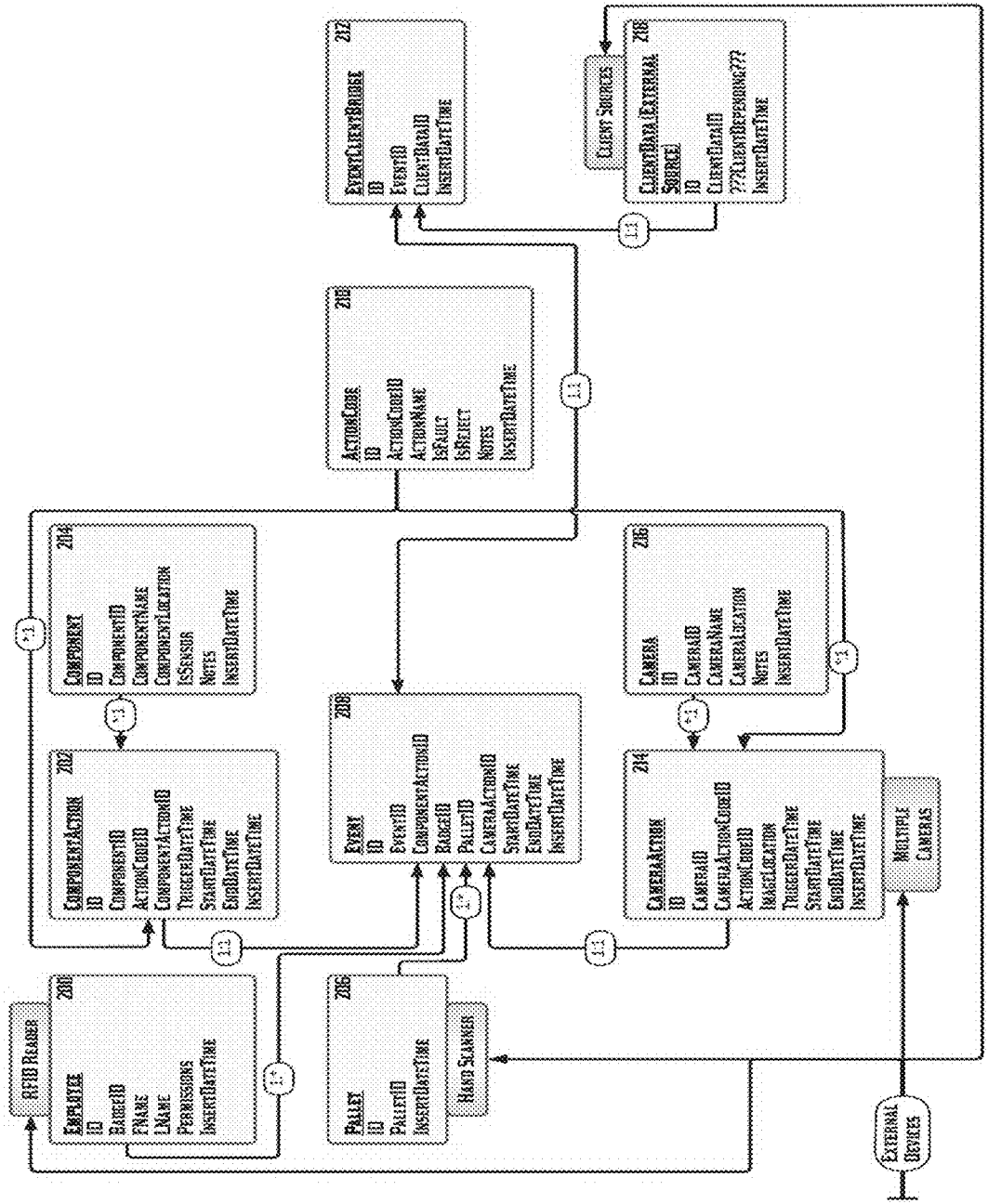
FIG. 4 is a data model of the invention.

FIG. 4 is a data model of the invention. RFID reader employee data 200 contains data fields appropriate to determining if a given employee is authorized and capable of using the system. While accessing the data fields for tracing or tracking a pallet is easy, using the machinery (which spans many feet/meters and contains numerous actuators, mechanical & electrical devices and so forth) is not. Assuming that the employee ID is approved, the machine can begin operations.

The pallet data structure 206 is the next item needed for a run: the size and shape of the cans, the reason the pallet is being inspected, the potential buyer, instructions how to handle the cans during and after inspection and so forth are all required and provided by the hand scanner which is used to scan the code on the pallet as it is placed into the machine.

Components of the system break down into two general categories: the cameras doing the visual inspection and the machinery & process handling the cans. These non-camera components may include, as noted previously, sensors, switches, conveyors, air jets, and more, all of which can be measuring and/or monitoring limits, line control/statuses, switch statuses, camera operations, pneumatic variables and so forth. Each type of component has a component data structure: component 202 or camera 216 are not the physical objects but the data fields for these components, which are needed to operate the system and even to assist in tracking cans and pallets and outcomes and dispositions.

This in turn means that there is a component action data structure 202 and a camera action data structure 214, either of which is instantiated whenever a component/camera is activated, for example, by scanning a can with a camera. Behind these data structures there is in turn the action code 210 which details the action taken, whether a can was or was not rejected, and so forth: this action code is then used in building the component action and camera action 202 and 214, which are then used to build an event 208 when one occurs.

Either type is added to an Event container 208 which contains the data required to understand what has happened to cans on a pallet or even the individual cans of the pallet. As was seen in FIGS. 2 and 3, events of any type flow to the comprehensive database and are stored in a manner allowing numerous outputs such as via event client bridge 212, and of course, can be augmented with external data from a client-side computer.

The disclosure is provided to render practicable the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

Methods and components are described herein. However, methods and components similar or equivalent to those described herein can be also used to obtain variations of the present invention. The materials, articles, components, methods, and examples are illustrative only and not intended to be limiting.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art.

Having illustrated and described the principles of the invention in exemplary embodiments, it should be apparent to those skilled in the art that the described examples are illustrative embodiments and can be modified in arrangement and detail without departing from such principles. Techniques from any of the examples can be incorporated into one or more of any of the other examples. It is intended that the specification and examples be considered as exemplary only, with a true scope and spirit of the invention being indicated by the following claims.

What is claimed is:

1. A system for quickly inspecting and sorting large quantities of cans held for inspection, and tracking and tracing can disposition down to the level of the individual can including can counts both good and bad, the cans having an interior, a side exterior, and a dome exterior, and having decoration, some of the cans being unacceptable, the cans stacked in layers on a pallet, the pallet having thereon a scannable pallet code, the system comprising:
   a set of components comprising:
   a plurality of non-camera components including at least one sensor;
   a badge scanner and an employee data structure;
   a human machine interface allowing control of the system after the badge scanner has accessed the employee data structure;
   a hand scanner operative to scan the scannable pallet code and derive therefrom a pallet data container having therein a pallet ID, a hand scanner ID, and the time of insertion of the pallet into a depalletizer;
   the depalletizer operative to push one of the layers of the cans from the pallet;
   a plurality of transfer conveyors operative to receive the layer of the cans and sequentially transfer and reduce the layer of the cans;
   a single filer operative to receive the transferred and reduced layer of the cans and place the cans into single file on a single file bottom vacuum conveyor;
   a plurality of cameras, each camera operative to inspect one part of each of the cans, each respective camera having a respective disposition chute, each camera operative to direct the unacceptable cans to the camera's respective disposition chute;

an action code data structure template able to contain information regarding each action taken by the system;

a component data structure associated with each non-camera component of the system;

a component action data structure associated with an action performed by each non-camera component of the system and having therein data taken from the action performed by the non-camera component of the system and an instantiation of the action code data structure;

a respective camera data structure associated with each of the cameras;

a camera action data structure associated with an action performed by each camera;

an event data container associated with each component action data structure and each camera action data structure and having therein data taken from the action performed by the camera and an instantiation of the camera action code data structure;

a programmable logic controller containing in non-transitory storage media instructions enabling it to control the system, including non-camera components and cameras, and further enabling it to transfer data from the human machine interface to a comprehensive database;

the plurality of cameras, the plurality of non-camera components, the programmable logic controller, the badge scanner and the hand scanner operative to send all of the data structures and the event data container to the comprehensive database;

a CPU containing in non-transitory storage media instructions enabling it to produce reports and data files in a first format, and further enabling it to print the reports and data files on a printer, and further enabling it to accept access from a client computer.

2. The system of claim 1,
the action code data structure further comprising:
an action code ID field, an action name field, an indication of the can being found unacceptable field;
the camera action data structure further comprising:
a camera action code ID field; an image location field, and a trigger date and time field;
the non-camera data structure further comprising:
a non-camera component action code ID field, and a trigger date and time field.

3. The system of claim 2, wherein:
at least one first-position camera of the plurality of cameras is disposed above the single file bottom vacuum conveyor and oriented to view downward into the interior of each of the cans as the cans are conveyed underneath the at least one first-position camera.

4. The system of claim 3, wherein:
at least one second-position camera of the plurality of cameras is disposed adjacent the single file bottom vacuum conveyor and oriented to view sideways to the side exterior and the decoration of each of the cans as the cans are conveyed adjacent the at least one second-position camera.

5. The system of claim 4, further comprising:
a vacuum transfer station having a single file top vacuum conveyor operative to convey the can, the single file bottom conveyor then departing from the can whereby the can is suspended with the can dome exterior visible;

at least one third-position camera of the plurality of cameras is disposed beneath the single file top vacuum conveyor and oriented to view upward to the can dome exterior as the can is conveyed over the at least one third-position camera;

an ink dot printer operative to print an inspection mark onto the can dome exterior using an ink invisible to the naked eye.

6. The system of claim 4, further comprising:
a bulk rejection gate allowing the entire layer of the cans to be removed from the system without being placed in single file and without being inspected.

7. A process for rapidly inspecting and sorting large quantities of cans held for inspection, and tracking and tracing can disposition down to the level of the individual can, including can counts both good and bad, the cans having an interior, a side exterior, and a dome exterior, and decoration, some of the cans being unacceptable, the cans stacked in layers on a pallet, the pallet having thereon a scannable pallet code, the process comprising:

scanning the scannable pallet code;
depalletizing the cans one of the layers at a time;
sequentially reducing the layers of the cans and place the cans into single file;
conveying the cans while securing them so that the interior and the side exterior are visible;
passing the cans beneath at least one first position camera operative to transfer to a first disposition chute any the can having an unacceptable interior;
passing the cans adjacent to at least one second position camera operative to transfer to a second disposition chute any the can having an unacceptable side exterior and unacceptable decoration;
conveying the cans while securing them so that the dome exterior is visible;
passing the cans above at least one third position camera operative to transfer to a third disposition chute any the can having an unacceptable dome exterior;
printing an inspection mark onto the can dome exterior using an ink invisible to the naked eye;
providing an action code data structure template able to contain information regarding each action taken;
providing a component data structure associated with each non-camera component used to carry out the process;
providing a component action data structure associated with an action performed by each non-camera component used to carry out the process and having therein data taken from the action performed by the non-camera component and an instantiation of the action code data structure;
providing a respective camera data structure associated with each of the cameras used to carry out the process;
providing a camera action data structure associated with an action performed by each camera used to carry out the process;
providing an event data container associated with each component action data structure and each camera action data structure and having therein data taken from the action performed by the camera, including an indication of acceptance/rejection, any reason for rejection, and an instantiation of the camera action code data structure;
storing in a comprehensive database the event data container.

* * * * *